(12) United States Patent
Jones

(10) Patent No.: US 11,511,341 B2
(45) Date of Patent: Nov. 29, 2022

(54) MANUFACTURING METHOD

(71) Applicant: ROLLS-ROYCE POWER ENGINEERING PLC, Derby (GB)

(72) Inventor: Thomas S Jones, Derby (GB)

(73) Assignee: ROLLS-ROYCE POWER ENGINEERING PLC, Derby (GB)

( * ) Notice: Subject to any disclaimer, the term of this patent is extended or adjusted under 35 U.S.C. 154(b) by 243 days.

(21) Appl. No.: 16/585,210

(22) Filed: Sep. 27, 2019

(65) Prior Publication Data

US 2020/0108446 A1 Apr. 9, 2020

(30) Foreign Application Priority Data

Oct. 3, 2018 (GB) ..................................... 1816145

(51) Int. Cl.
| | |
|---|---|
| *B22F 3/24* | (2006.01) |
| *B33Y 40/00* | (2020.01) |
| *B33Y 80/00* | (2015.01) |
| *B22F 5/00* | (2006.01) |
| *B22F 10/10* | (2021.01) |

(52) U.S. Cl.
CPC ............... *B22F 3/24* (2013.01); *B22F 5/009* (2013.01); *B22F 10/10* (2021.01); *B33Y 40/00* (2014.12); *B33Y 80/00* (2014.12); *B22F 2003/248* (2013.01)

(58) Field of Classification Search
CPC ................................... B22F 3/24; B33Y 40/00
USPC .......................................................... 419/53
See application file for complete search history.

(56) References Cited

U.S. PATENT DOCUMENTS

| | | | | |
|---|---|---|---|---|
| 9,828,679 | B1* | 11/2017 | Brooks | .................... B22F 10/20 |
| 2004/0031780 | A1* | 2/2004 | Hagemeister | ...... A61C 13/0004 |
| | | | | 219/121.85 |
| 2006/0186101 | A1 | 8/2006 | Hagemeister et al. | |
| 2010/0244333 | A1 | 9/2010 | Bedal et al. | |
| 2014/0034626 | A1* | 2/2014 | Illston | .................... B23K 26/34 |
| | | | | 219/121.78 |
| 2015/0306667 | A1 | 10/2015 | Yao | |
| 2018/0162061 | A1 | 6/2018 | Mark | |

FOREIGN PATENT DOCUMENTS

| | | | |
|---|---|---|---|
| EP | 1 358 855 A1 | 11/2003 | |
| EP | 3 132 873 A1 | 2/2017 | |
| EP | 3 278 908 A1 | 2/2018 | |
| EP | 3278908 A1 * | 2/2018 | ............ B29C 64/40 |
| EP | 3 335 819 A1 | 6/2018 | |
| WO | 2018/193306 A2 | 10/2018 | |

OTHER PUBLICATIONS

Feb. 5, 2020 extended Search Report issued in European Patent Application No. 19199743.6.

Mar. 26, 2019 combined Search and Examination Report issued in British Patent Application No. 1816145.5.

* cited by examiner

*Primary Examiner* — Weiping Zhu

(74) *Attorney, Agent, or Firm* — Oliff PLC

(57) ABSTRACT

The present disclosure relates to a method of forming a component and at least one support structure joined to the component by additive layer manufacturing, wherein the support structure has a reduced density and/or increased porosity relative to the component. The method then comprises a subsequent heat treatment step at increased pressure on the component and support structure to separate the component and at least one support structure.

15 Claims, 4 Drawing Sheets

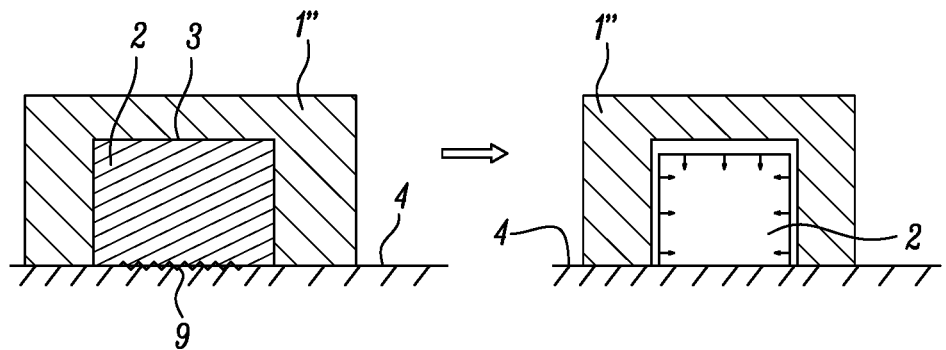
*FIG. 5a*  *FIG. 5b*
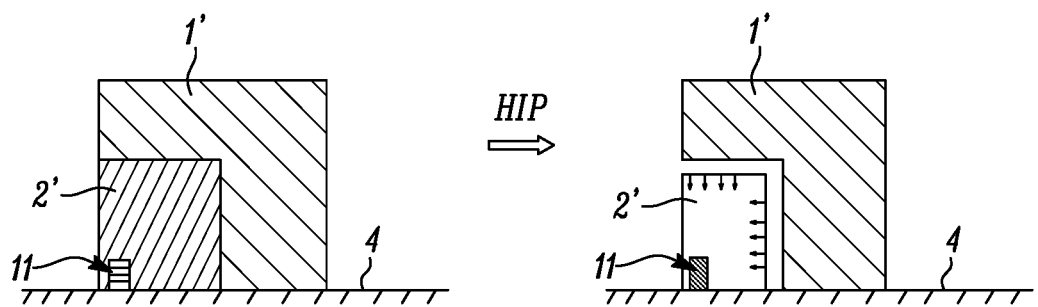
*FIG. 6a*  *FIG. 6b*

MANUFACTURING METHOD

This disclosure claims the benefit of UK Patent Application No. GB 1816145.5, filed on 3 Oct. 2019, which is hereby incorporated herein in its entirety.

FIELD OF THE DISCLOSURE

The present disclosure relates to an additive layer manufacturing method for producing a component. In particular, the disclosure relates to an additive layer manufacturing method for supporting components during build to both minimise distortion and enable building of the resulting component whilst reducing subsequent processing requirements.

BACKGROUND OF THE DISCLOSURE

Components manufactured by additive layer manufacturing (ALM) methods can have significant performance, weight, cost and lead time advantages over components manufactured by more traditional methods.

Powder bed ALM methods construct components layer by layer by depositing powder on a base plate and then selectively consolidating the powder using a laser or other heat source. Alternatively, blown powder ALM methods propel powder into the path of a laser or other heat source which melts and consolidates the powder which cools to form the component. The laser is moved to enable the material to deposit in the form of the component, one layer at a time. These steps are repeated to produce a three dimensional component.

Components produced using ALM methods inevitably contain inherent residual stresses, often leading to distortion. This is particularly pertinent to components having overhanging features. To manage this distortion, support structures are added to the component to add rigidity. ALM methods are also unable to produce components with overhangs greater than 45 degrees, for these overhangs support structures are required to prevent build failures. Such support structures are built up layer upon layer along with the component and consequently use a significant portion of the powdered material (often up to around 30%) and laser time. The support structures are subsequently removed from the component and disposed of.

Removal of the support structures is typically carried out manually using hand tools or machine tools. These processes add significant time, cost and limits to possible geometry of the resultant component. Furthermore, unless the surface of the component is completely machined, subsequent dressing of components to remove the "witness lines" remaining after the removal of the support structures is often necessary especially in areas sensitive to surface finishing.

Hot isostatic pressing (HIP) is a heat treatment in which high (up to 200 MPa) isostatic pressure is applied to a component, e.g. a component formed by an additive layer manufacturing (ALM) method, contained within an inert atmosphere in a sealed canister at a high temperature.

There is a desire to provide a method that minimises distortion in components manufactured by ALM methods, and reduce geometry restrictions relating to overhangs whilst ameliorating at least some of the problems associated with the known support structures.

SUMMARY OF THE DISCLOSURE

In a first aspect, the present disclosure provides a method of manufacturing a component, said method comprising forming the component and at least one support structure joined to the component by additive layer manufacturing, wherein at least a portion of the support structure has a reduced density and/or increased porosity relative to the component and subsequently carrying out a heat treatment at increased pressure on the component and support structure to at least partially separate the component and at least one support structure.

By providing at least one support structure having at least a portion of reduced density/increased porosity compared to the component and subsequently heating the component and support structure under pressure, the support structure is consolidated into a more dense structure with an associated reduction in volume. As the support structure reduces in volume, it shrinks away from contact with the component which will have a far lower (if any) reduction in volume. Thus the heat treatment effects post-build separation of the support member from the component thus avoiding the need for manual removal of the support structure and the associated finishing.

Optional features will now be set out. These are applicable singly or in any combination with any aspect.

In some embodiments, the method comprises forming a plurality of support structures, each support structure having at least a portion having a lower density/greater porosity than the component.

The method comprises forming the component and the at least one support structure (e.g. the plurality of support structures) by additive layer manufacturing using a powder material. The powder material may be a metal or metal alloy e.g. nickel, copper, iron, steel, nickel alloys, titanium, titanium alloys, magnesium, magnesium alloys, aluminium, aluminium alloys, vanadium, zirconium, hafnium, or refractory metals such as niobium, molybdenum, tantalum, tungsten and rhenium. The powder material may be ceramic, metallic-ceramic combination or metal matrix composite e.g. from zirconium, yttria or silicon carbide. The additive layer manufacturing method will comprise depositing and selectively consolidating consecutive layers of powder material using a heat source. This step is repeated multiple times to form the three dimensional component and at least one support structure layer upon layer, the layers being stacked in the build direction.

In some embodiments, the portion of the/each support structure having reduced density/increased porosity may be formed by reducing the energy density of the heat source during formation of the portion of the support structure such that the powder material is not fully consolidated (e.g. by decreasing the power of the heat source, increasing the speed of passage of the heat source over the powder material, increasing spacing between the passages of the heat source over the powder material, increasing the spot size of the heat source for a given power or providing excess energy density).

In some embodiments, the entire of the/each support structure has a reduced density/increased porosity compared to the component i.e. the or the plurality of support structures is formed of less dense/more porous material than the component.

In some embodiments, the method may comprise forming the at least one support structure with at least one encapsulated pocket or void, the pocket/void having a reduced density compared to the component. This increases the shrinkage of the support structure during the post-build heat treatment as the pocket/void collapses.

The or each pocket may be formed by not consolidating the powder material in the pocket region(s) during formation of the at least one support structure. In this way, the pocket will contain unconsolidated powder material (e.g. having a 70% density).

The pocket may be evacuated of powder (e.g. through a channel provided during formation of the support structure) to form a void and subsequently resealed (e.g. by welding over the entrance of the channel) prior to heat treatment.

In embodiments comprising an encapsulated pocket/void, the support structure surrounding the pocket/void may be formed of material having the same density as the component or may be formed of reduced density/increased porosity material in the same manner as embodiments without the pocket(s)/void(s).

The at least one encapsulated pocket/void may be fully encapsulated by the support structure. In some embodiments, where the support structure extends between a base plate (on which the first layer of powder is deposited during the additive layer manufacturing step) and the join with the component, the pocket(s)/void(s) may be partly defined by the base plate. In other embodiments where the support structure bridges two surfaces of the component, e.g. bridges an overhang and a vertical portion of the component, the pocket(s)/void(s) may be partly defined by the surface which is more easily accessible/processable (e.g. the vertical portion of the component).

In order to facilitate separation of the support structure(s) from the component during the heat treatment step, the method may comprise forming a weakened portion at the join between the component and the support structure(s).

In some embodiments, the weakened portion is formed by using a reduced energy density parameter when consolidating the powder material at the join between the component and the at least one support structure. This reduced energy density will lead to reduced consolidation/fusion of the powder material along the join thus leading to weakness along the join.

The weakened portion may be formed by leaving powder material in the region of the join partly unconsolidated by not exposing one or more layers of the powder material in region of the join to the heat source. By inducing this thicker layer of powder at the join, the laser or electron beam will not fully penetrate the powder layer leaving some of the powder un-melted which will present a weakened portion allowing separation along the join during the subsequent heat treatment step.

The thicker layer may have a thickness of between 100-500% of the thickness of the standard/regular layers used to build the support structure(s)/component (e.g. 20-100 microns).

In some embodiments, the heat treatment comprises hot isostatic pressing.

In some embodiments, the method comprises forming one or more notch(es) on the at least one support structure adjacent the join with the component e.g. adjacent the weakened portion. The notch(es) may be formed by not consolidating the powder material in the vicinity of the desired notch during the additive layer manufacturing step.

In some embodiments, the method may comprise forming the at least one support structure with at least one and preferably a plurality of anchors, wherein the anchor(s) is/are denser than the surrounding support structure (e.g. the anchors may be fully dense). The anchors can be formed during the additive layer manufacturing process e.g. using the parameters to form the denser component. The anchors(s) can be provided to anchor the support structure(s) to the base plate. The anchor(s) help tether the support structure during shrinkage so that separation occurs along the join between the component and the support structure(s) rather than between the support structure and the base plate.

The/each anchor may be an elongated pin (e.g. a fully dense elongated pin) extending from the base plate into the support structure.

In other embodiments, the anchor may be a localised region of increased bonding of the support structure to the base plate e.g. a horizontal layer of increased bonding to the base plate e.g. towards the centre of the support structure. The increased bonding may be effected by increasing the energy density of the heat source or exposing the powder material to the heat source multiple times during formation of the anchor bonding.

In other embodiments, where the support structure bridges two surfaces of the component, e.g. bridges an overhang and a vertical portion of the component, the anchor(s) (e.g. the elongated pin(s)) may be provided to anchor the support structure to one of the two surfaces of the component, namely to the surface which is more easily accessible/processable (e.g. the vertical portion). In this way, the anchor(s) help tether the support structure during shrinkage so that separation occurs along the join between the component and the support structure(s) at the less easily accessible/less easily processable surface (e.g. the overhang surface).

The method may be used to form a component of a gas turbine engine.

In a second aspect, there is provided a component manufactured according to the first aspect.

In a third aspect, there is provided a gas turbine engine comprising a component manufactured according to the first aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIGS. 5a and 5b show a support structure having an anchor to a base plate before (6a) and after (6b) heat treatment;

FIGS. 6a and 6b show a support structure having an anchoring pin extending to the base plate before (6a) and after (6b) heat treatment.

DETAILED DESCRIPTION AND FURTHER OPTIONAL FEATURES OF THE DISCLOSURE

Figure 1:
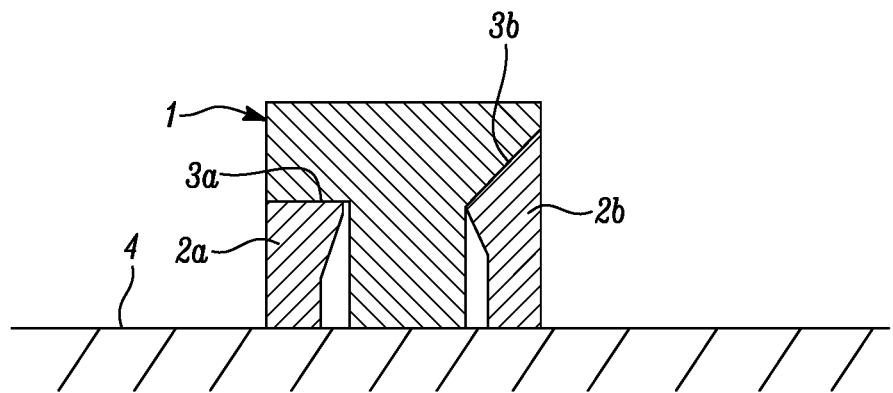
FIG. 1 shows a component with associated support structures prior to heat treatment.

FIG. 1 shows a component 1 having overhanging features which require support during manufacture to avoid distortion and enable the component to be built. The overhangs are supported by two support structures 2a, 2b.

Both the component 1 and the support structures 2a, 2b are formed using additive layer manufacturing where a layer of powder material is deposited on a base plate 4 and selectively consolidated to from a horizontal cross section of the component 1 and support structures 2a, 2b. This step is repeated multiple times to form the three dimensional component 1 and the support structures 2a, 2b layer upon layer, the layers being stacked in the build direction vertically away from the base plate.

The parameters used during consolidation of the powder material are varied within each layer such that the parameters used to form the horizontal cross section of the component 1 in each layer result in a more dense/less porous consolidated material (e.g. a fully dense material) than the parameters used to form the horizontal cross section of the support structures 2a, 2b.

As a result, the consolidated material forming the support structure 2a, 2b is less dense/more porous that the consolidated material forming the component.

The support structure 2a, 2b abut and support the overhangs of the component at joins 3a, 3b.

In a subsequent step, the component 1 and support structures 2a, 2b are subjected to hot isostatic pressing.

Figure 2:
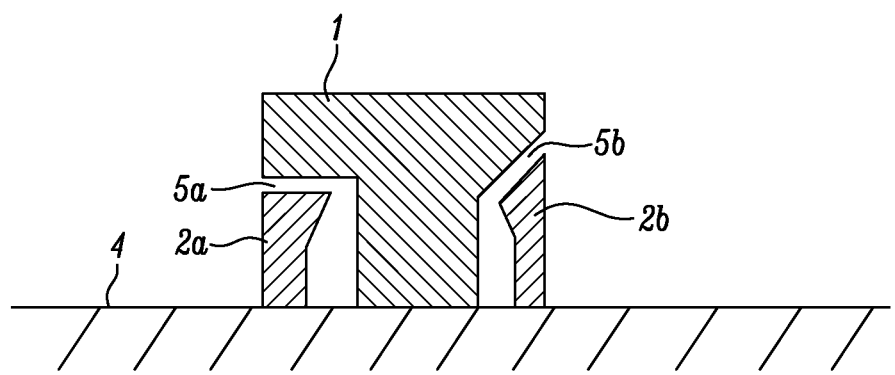
FIG. 2 shows the component of FIG. 1 with the associated support structures after heat treatment.

FIG. 2 shows the component 1 and support structures 2a, 2b after hot isostatic pressing. As a result of the elevated temperature and pressure, the porous, semi-dense material forming the support structures 2a, 2b is fully consolidated into a fully dense material with an associated volume change. As the component 1 is already substantially fully dense, the hot isostatic pressing does not result in any significant change in volume of the component 1 and thus the support structures 2a, 2b shrinkage away from the component 1 thus forming gaps 5a, 5b between the component 1 and the support structures 2a, 2b.

Figure 3:
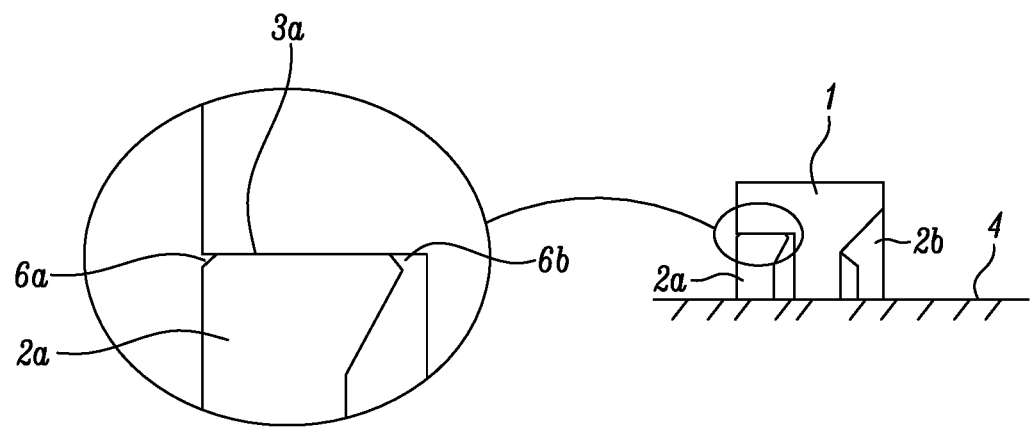
FIG. 3 shows the formation of notches at component/support structure join.

FIG. 3 shows the formation of sharp notches 6a, 6b at the join between the overhangs of the component 1 and the support structures 2a, 2b. This helps provide a weakness along the joins 3a, 3b thus facilitating separation.

Figures 4A, 4B:
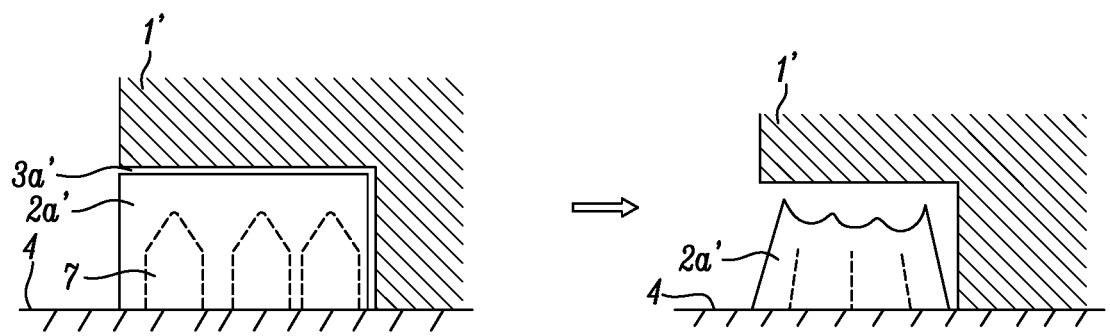
FIGS. 4a and 4b show a support structure having encapsulated voids before (5a) and after (5b) heat treatment.

FIG. 4a shows a support structure 2a' supporting an overhang of a component 1' at a join 3a'. The support structure 2a' has a plurality of internal pockets 7 which are filled by unconsolidated powder material (e.g. with a density of 70%) and which are defined by the support structure 2a' and the base plate 4. As shown in FIG. 4b, during hot isostatic pressing, the pockets 7 collapse to enhance the volume reduction of the support structure 2a. In other embodiments, the pockets could be emptied of powder material and then resealed (e.g. by welding) to create internal voids which would provide an even greater volume reduction during hot isostatic pressing.

FIG. 5a shows a support structure 2 supporting an internal chamber within a component 1'. An anchor 9 in the form of enhanced bonding between the support structure 2 and the base plate 4 is provided so that during hot isostatic pressing, the support structure remains anchored to the base plate as shown in FIG. 5b therefore ensuring the support retracts from the component surface.

Similarly, in FIGS. 6a and 6b, an anchor in the form of a pin 11 is provided extending from the base plate 4 into the support structure 2' so that the support structure 2a is anchored to the base plate 4 during shrinkage away from the component 1".

Figures 7A, 7B:
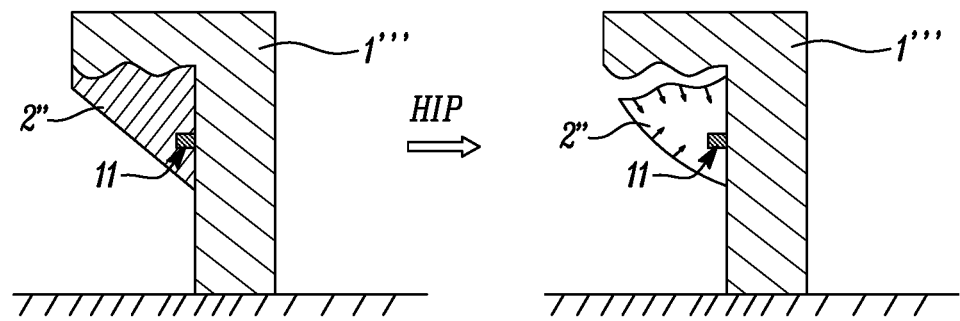
FIGS. 7a and 7b show a support structure having an anchoring pin extending to a second surface of the component before (7a) and after (7b) heat treatment.

In the embodiment shown in FIGS. 7a and 7b, the support structure 2" bridges two surfaces of the component 1", i.e. bridges an overhang and a vertical portion 12 of the component 1 rather than standing on the base plate 4.

The anchoring pin 11 extends from the vertical portion 12 of the component 1 into the support structure 2" so that during hot isostatic pressing, the support structure 2" shrinks away from the overhang and is anchored to the vertical portion 12 which is more easily accessible/processable for subsequent removal of the support structure 2".

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A method of forming a component, the method comprising:
   forming the component and at least one support structure joined to the component at a join by additive layer manufacturing, at least a portion of the support structure having at least one of a reduced density and increased porosity relative to the component;
   subsequently carrying out a heat treatment at increased pressure on the component and the at least one support structure to at least partially separate the component and the at least one support structure by consolidating the at least one support structure and causing the support structure to separate from contact with the component; and
   forming a weakened portion at the join between the component and the at least one support structure by using a reduced energy density parameter when consolidating a powder material at the join, or leaving the powder material at the join partly unconsolidated by not exposing one or more layers of the powder material at the join to the heat treatment,
   wherein the heat treatment comprises hot isostatic pressing.

2. The method according to claim 1, comprising forming a plurality of support structures, each support structure having at least one of a lower density and greater porosity than the component.

3. The method according to claim 1, comprising forming the at least one support structure of a material having at least one of a lower density and increased porosity relative to the component.

4. The method according to claim 1, comprising forming at least one encapsulated pocket or void in the at least one support structure, the at least one encapsulated pocket or void having a reduced density relative to the component.

5. The method according to claim 1, comprising forming at least one notch on the at least one support structure adjacent to the join with the component.

6. The method according to claim 1, comprising forming the at least one support structure with at least one anchor, wherein the at least one anchor is denser than a surrounding support structure.

7. The method according to claim 6, wherein the at least one anchor extends from a base plate upon which the component and the at least one support structure are formed by additive layer manufacturing into the at least one support structure.

8. The method according to claim 6, wherein the at least one support structure bridges two surfaces of the component and the at least one anchor extends from one of the surfaces into the at least one support structure.

9. The method according to claim 1, wherein a bonding between a base plate upon which the component and the at least one support structure are formed by additive layer manufacturing is enhanced towards the center of a join between the base plate and support structure.

10. The method according to claim 1, wherein consolidating the at least one support structure includes consolidating the support structure into a more dense structure with an associated reduction in volume.

11. The method according to claim 1, wherein consolidating the at least one support structure includes consolidating the support structure into a more dense structure with an associated reduction in volume greater than a reduction in volume of the component.

12. The method according to claim 1, wherein a bonding between a base plate upon which the component and the at least one support structure are formed by additive layer manufacturing is enhanced towards the center of a join between the base plate and support structure by increasing an energy density of the heat treatment or exposing a powder material to the heat treatment multiple times during formation of the bonding.

13. A gas turbine component manufactured according to claim 1.

14. A gas turbine engine comprising a component according to claim 13.

15. A method of forming a component, the method comprising:
   forming the component and at least one support structure joined to the component by additive layer manufacturing, at least a portion of the support structure having at least one of a reduced density and increased porosity relative to the component; and
   subsequently carrying out a heat treatment at increased pressure on the component and the at least one support structure to at least partially separate the component and the at least one support structure by consolidating the at least one support structure and causing the support structure to separate from contact with the component,
   wherein the heat treatment comprises hot isostatic pressing, and
   a bonding between a base plate upon which the component and the at least one support structure are formed by additive layer manufacturing is enhanced towards the center of a join between the base plate and support structure by increasing an energy density of the heat treatment or exposing a powder material to the heat treatment multiple times during formation of the bonding.

* * * * *